(12) United States Patent
Ikai et al.

(10) Patent No.: US 10,564,621 B2
(45) Date of Patent: *Feb. 18, 2020

(54) FAILURE DETECTION AND CORRECTION CONTROL SYSTEM OF MACHINE TOOL USING CHRONOLOGICAL CONTROL DATA

(71) Applicant: FANUC CORPORATION, Yamanashi (JP)

(72) Inventors: Satoshi Ikai, Yamanashi (JP); Shoutarou Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,487

(22) Filed: Apr. 13, 2018

(65) Prior Publication Data

US 2018/0299861 A1 Oct. 18, 2018

(30) Foreign Application Priority Data

Apr. 17, 2017 (JP) ................................ 2017-081395

(51) Int. Cl.
*G05B 19/404* (2006.01)
*B23Q 1/48* (2006.01)
(Continued)

(52) U.S. Cl.
CPC ......... *G05B 19/404* (2013.01); *B23Q 1/4857* (2013.01); *B23Q 1/5406* (2013.01); *B23Q 1/623* (2013.01); *G05B 2219/33315* (2013.01)

(58) Field of Classification Search
None
See application file for complete search history.

(56) References Cited

U.S. PATENT DOCUMENTS 5,768,137 A 6/1998 Polidoro et al.
5,871,391 A 2/1999 Pryor
(Continued)

FOREIGN PATENT DOCUMENTS

CA 2986736 12/2018
CN 1211488 3/1999
(Continued)

OTHER PUBLICATIONS

Office Action dated Aug. 15, 2019 in Chinese Application No. 201810325683.6.
(Continued)

*Primary Examiner* — Bernard G Lindsay
(74) *Attorney, Agent, or Firm* — Wenderoth, Lind & Ponack, L.L.P.

(57) ABSTRACT

A control system of a machine tool includes an analysis device, the analysis device includes acquisition portions which acquire chronological speed control data when a work is machined and which acquire spatial machined surface measurement data after the machining of the work, a data-associating processing portion which associates the speed control data and the machined surface measurement data with each other, a machined surface failure detection portion which detects a failure depth of a failure location on the machined surface of the work and an identification portion which identifies the control data of the failure location corresponding to the machined surface measurement data of the failure location so as to identify a failure depth corresponding to the control data of the failure location and the numerical control device corrects the control data based on the control data of the failure location and the corresponding failure depth.

9 Claims, 10 Drawing Sheets

(51) Int. Cl.
  *B23Q 1/54* (2006.01)
  *B23Q 1/62* (2006.01)

(56) References Cited

U.S. PATENT DOCUMENTS

| | | | |
|---|---|---|---|
| 6,449,526 B1* | 9/2002 | Sachs | B23Q 17/09 |
| | | | 700/164 |
| 2001/0024097 A1* | 9/2001 | Kunugi | G05B 19/401 |
| | | | 318/567 |
| 2008/0115856 A1 | 5/2008 | Altenhorter | |
| 2010/0057257 A1* | 3/2010 | Ichikawa | G05B 19/4083 |
| | | | 700/264 |
| 2010/0207567 A1 | 8/2010 | Mori et al. | |
| 2014/0087628 A1* | 3/2014 | Bharadwaj | B24B 19/26 |
| | | | 451/5 |
| 2014/0148939 A1 | 5/2014 | Nakano et al. | |
| 2014/0157610 A1 | 6/2014 | Garvey et al. | |
| 2016/0054724 A1* | 2/2016 | Oda | G05B 19/4093 |
| | | | 700/109 |
| 2017/0300034 A1* | 10/2017 | Nagaoka | G05B 19/406 |
| 2018/0133901 A1 | 5/2018 | Kuno | |
| 2018/0267505 A1* | 9/2018 | Shinoda | G05B 19/4086 |
| 2018/0275639 A1* | 9/2018 | Shinoda | G05B 19/416 |
| 2018/0307202 A1* | 10/2018 | Ikai | G06T 7/13 |

FOREIGN PATENT DOCUMENTS

| | | |
|---|---|---|
| CN | 101145047 | 3/2008 |
| CN | 101722438 | 6/2010 |
| CN | 101813931 | 8/2010 |
| CN | 101866163 | 10/2010 |
| CN | 101984379 | 3/2011 |
| CN | 102029546 | 4/2011 |
| CN | 103029131 | 4/2013 |
| CN | 104540467 | 4/2015 |
| CN | 104889829 | 9/2015 |
| CN | 105388842 | 3/2016 |
| CN | 106325209 | 1/2017 |
| CN | 106406228 | 2/2017 |
| DE | 10 2007 063 318 | 3/2009 |
| DE | 10 2015 119 240 | 3/2017 |
| JP | 2006-255826 | 9/2006 |
| JP | 2007-190628 | 8/2007 |
| JP | 2010-54399 | 3/2010 |
| JP | 2010-262474 | 11/2010 |
| JP | 2011-095879 | 5/2011 |
| JP | 2014-10687 | 1/2014 |
| JP | 2014-164597 | 9/2014 |
| JP | 105404236 | 3/2016 |
| JP | 2016-57843 | 4/2016 |
| JP | 2016-078150 | 5/2016 |
| JP | 2016-140899 | 8/2016 |
| JP | 2017-13178 | 1/2017 |
| JP | 2017-54463 | 3/2017 |

OTHER PUBLICATIONS

Office Action dated Aug. 26, 2019 in Chinese Application No. 201810348993.X.
Office Action dated Jul. 31, 2019 in U.S. Appl. No. 15/914,699.
Office Action dated Aug. 9, 2019 in U.S. Appl. No. 15/947,981.
Notification of Reasons for Refusal dated Sep. 25, 2018 in Japanese Patent Application No. 2017-048903.
Office Action dated Apr. 2, 2019 in Chinese Patent Application No. 201810241571.2.
Office Action dated Mar. 22, 2019 in U.S. Appl. No. 15/928,163.
Office Action dated Jun. 3, 2019 in Chinese Patent Application No. 201810200632.0.
Office Action dated Sep. 24, 2019 in German Patent Application No. 10 2018 002 303.7.
Office Action dated Dec. 12, 2019 in U.S. Appl. No. 15/914,699.

* cited by examiner

FAILURE DETECTION AND CORRECTION CONTROL SYSTEM OF MACHINE TOOL USING CHRONOLOGICAL CONTROL DATA

This application is based on and claims the benefit of priority from Japanese Patent Application No. 2017-081395, filed on 17 Apr. 2017, the content of which is incorporated herein by reference.

BACKGROUND OF THE INVENTION

Field of the Invention

The present invention relates to the control system of a machine tool which machines a work.

Related Art

A machine tool machines a work while moving at least one of the work (the item to be machined) and a tool along predetermined drive axes. In other words, the machine tool machines the work while varying a relative position of the work and the tool.

When the work is machined with the machine tool described above, a stripe pattern (failure) may occur on the machined surface of the work due to any cause such as vibrations. In other words, streaks or stripes may occur at predetermined intervals.

Hence, for example, Patent Documents 1 and 2 disclose technologies in which based on the movement path of the tip of a tool when a work is machined, a stripe pattern (failure) on the machined surface of the work is detected.

Patent Document 1: Japanese Unexamined Patent Application, Publication No. 2016-57843

Patent Document 2: Japanese Unexamined Patent Application, Publication No. 2017-13178

SUMMARY OF THE INVENTION

The inventors et al. of the present application have attempted an approach different from the technologies disclosed in Patent Documents 1 and 2 in order to detect a failure on the machined surface of a work. Specifically, as another method of detecting the failure on the machined surface of the work, after the machining of the work, a vision sensor or the like is used to sense an image of the machined surface of the work, image processing is performed on the data of the sensed image and thus the failure (streaks or stripes) on the machined surface are detected. In other words, the failure on the machined surface is detected from spatial machined surface measurement data after the machining of the work.

The present invention has an object to provide the control system of a machine tool which reduces, based on failure information detected from spatial machined surface measurement data after the machining of a work, the occurrence of a failure on the machined surface of the work.

(1) A control system. (for example, a numerical control system 100 of a machine tool which will be described later) of a machine tool which machines a work (for example, a work W which will be described later), includes: a control device (for example, a numerical control device 50 which will be described later) which controls a drive axis of the machine tool (for example, a machine tool 10 which will be described later) based on control data; a machined surface measurement device (for example, a machined surface measurement device 20 which will be described later) which measures a machined surface of the work; and an analysis device (for example, a machined surface failure analysis device 30 which will be described later) which analyzes a failure on the machined surface of the work, where the analysis device includes; a first acquisition portion (for example, a drive axis control data acquisition portion 31 which will be described later) which acquires, from the control device, the chronological control data when the work is machined; a second acquisition portion (for example, a machined surface measurement data acquisition portion 32 which will be described later) which acquires spatial machined surface measurement data after the machining of the work measured by the machined surface measurement device; a data-associating processing portion (for example, a data-associating processing portion 34 which will be described later) which associates the chronological control data acquired by the first acquisition portion and the spatial machined surface measurement data acquired by the second acquisition portion with each other; a machined surface failure detection portion (for example, a machined surface failure (depth) detection portion 35 which will be described later) which detects the failure on the machined surface of the work and a location thereof and a failure depth of the failure location based on the spatial machined surface measurement data acquired by the second acquisition portion; and an identification portion (for example, a failure location control data identification portion 36 which will be described later) which identifies, based on the control data and the machined surface measurement data associated with each other by the data-associating processing portion, control data of the failure location corresponding to the machined surface measurement data of the failure location detected by the machined surface failure detection portion so as to identify the failure depth corresponding to the control data of the failure location, and the control device corrects the control data of the drive axis of the machine tool based on the control data of the failure location identified by the analysis device and the corresponding failure depth.

(2) In the control system of the machine tool according to (1), the identification portion of the analysis device may generate information (S, u) of a group of the position S and the depth u of the failure in the control data of the failure location.

(3) In the control system of the machine tool according to (2), the control data may include position command information, and the control device may correct, based on the information (S, u) generated by the analysis device, the position command information corresponding to each of the positions S only by the depth u of the failure corresponding to each of the positions S.

(4) In the control system of the machine tool according to (2), the control data may be movement command data including information of a speed, an acceleration, and a jerk, and the control device may change, based on the information (S, u) generated by the analysis device, at least any one of the information of the speed, the acceleration, and the jerk corresponding to each of the positions S based on the depth u of the failure corresponding to each of the positions S.

(5) In the control system of the machine tool according to any one of (1) to (4), the control data acquired by the first acquisition portion may be position control data of the drive axis of the machine tool, and the data-associating processing portion: may produce a first work shape image based on the chronological position control data; may produce a second work shape image based on the spatial machined surface measurement data; and may associate the chronological position control data and the spatial machined surface measurement data with each other so as to superimpose the first work shape image and the second work shape image on each other.

(6) In the control system of the machine tool according to (5), the chronological position control data may be machine coordinate information, and the spatial machined surface measurement data may be machine coordinate information that is calculated based on machine coordinates of the machined surface measurement device.

(7) In the control system of the machine tool according to any one of (1) to (4), the first acquisition portion may acquire, from the control device, chronological position control data and chronological speed control data when the work is machined, which are the position control data and the speed control data of the drive axis of the machine tool and which are associated with each other, and the data-associating processing portion: may detect, based on a variation in the chronological speed control data, as an edge position of the work, a machining start position and a machining completion position so as to produce a first work shape image; may detect, based on the spatial machined surface measurement data, an edge position of the work so as to produce a second work shape image; may associate the chronological speed control data and the spatial machined surface measurement data with each other so as to superimpose the edge position of the first work shape image and the edge position of the second work shape image on each other; and may associate the chronological speed control data and the chronological position control data with each other so as to associate the chronological position control data and the spatial machined surface measurement data with each other.

(8) In the control system of the machine tool according to any one of (1) to (4), the first acquisition portion may acquire, from the control device, chronological position control data and chronological speed control data when the work is machined, which are the position control data and the speed control data of the drive axis of the machine tool and which are associated with each other, and the data-associating processing portion: may detect, based on a variation in a value obtained by subtracting a value corresponding to a variation in acceleration/deceleration from the chronological speed control data, as an edge position of the work, a machining start position and a machining completion position so as to produce a first work shape image; may detect, based on the spatial machined surface measurement data, an edge position of the work so as to produce a second work shape image; may associate the chronological speed control data and the spatial machined surface measurement data with each other so as to superimpose the edge position of the first work shape image and the edge position of the second work shape image on each other; and may associate the chronological speed control data and the chronological position control data with each other so as to associate the chronological position control data and the spatial machined surface measurement data with each other.

(9) In the control system of the machine tool according to any one of (1) to (8), the failure on the machined surface of the work may be a streak or a stripe.

(10) In the control system of the machine tool according to (1), the control data may be a command value or a feedback value, the command value may be a position command value, a speed command value or a torque command value, and the feedback value may be a position feedback value, a speed feedback value, or a current feedback value.

According to the present invention, it is possible to provide the control system of a machine tool which reduces, based on failure information detected from image data on the machined surface of a work, the occurrence of a failure on the machined surface of the work.

DETAILED DESCRIPTION OF THE INVENTION

Figure 1:
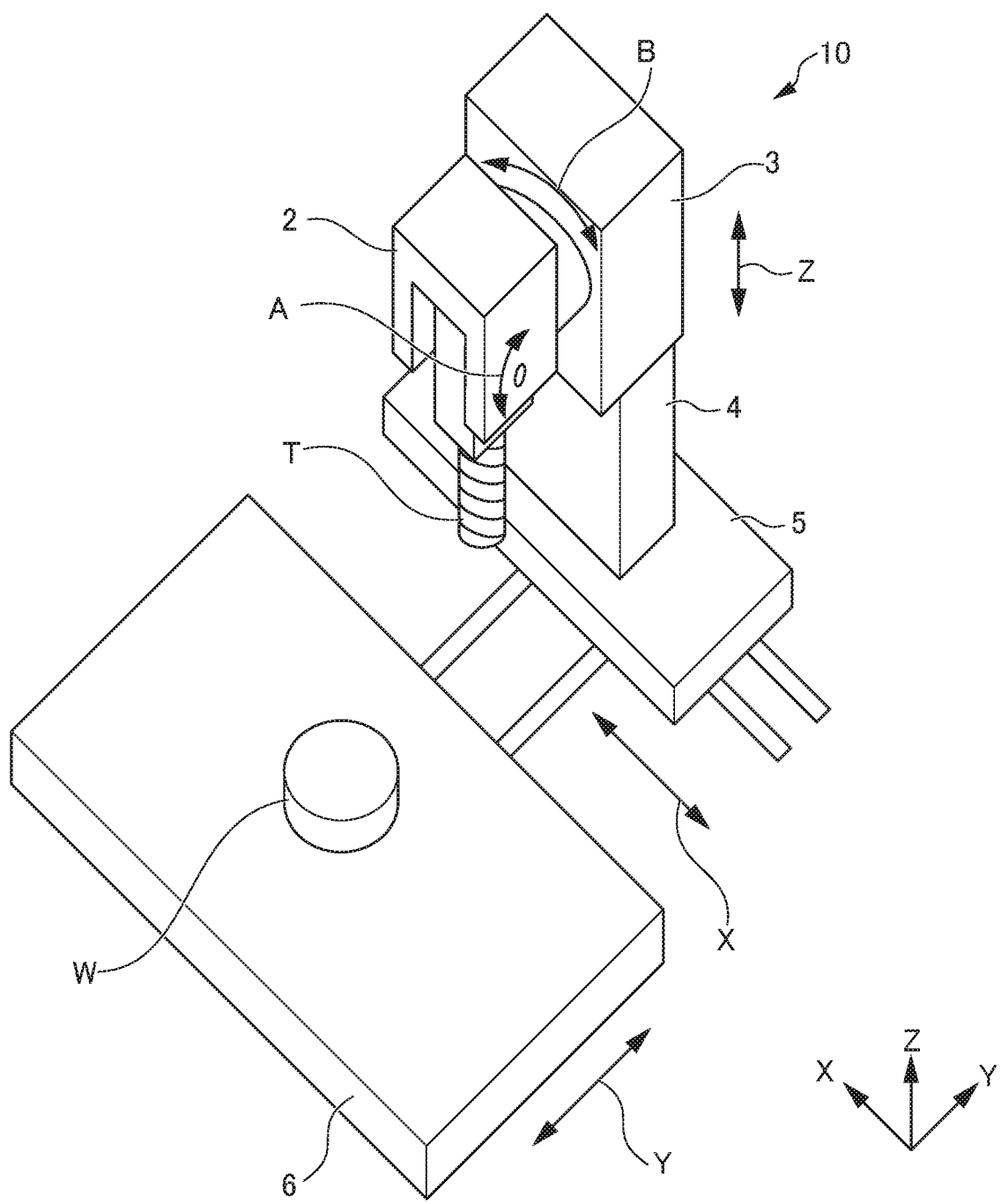
FIG. 1 is a perspective view showing an example of the configuration of a machine tool according to the present embodiment of the present invention.

Examples of the embodiment of the present invention will be described below with reference to accompanying drawings. In the drawings, the same or corresponding portions are identified with the same symbols.

Machine Tool

An example of a machine tool in a numerical control system according to the embodiment of the present invention will first be described. FIG. 1 is a perspective view showing an example of the configuration of the machine tool according to the present embodiment of the present invention. This machine tool 10 is a machine tool which performs machining. The machine tool in the numerical control system of the present invention is not limited to this machine tool, and may be an arbitrary industrial machine.

The machine tool 10 shown in FIG. 1 includes a head 2, a support member 3 which movably supports the head 2, a support column 4 which movably supports the support member 3, a base 5 which supports the support column 4, and a table 6. A tool T such as an end mill is fitted to the head 2, and a work W is mounted on the table 6. The machine tool 10 includes a drive device (unillustrated) and a numerical control device (unillustrated).

The drive device includes servomotors which will be described later. The drive device moves the base 5 in the direction of an X axis (arrow X), moves the table 6 in the direction of a Y axis (arrow Y) and moves the support member 3 in the direction of a Z axis (arrow Z). Furthermore, the drive device turns the tool T in the direction of an A axis (arrow A) with respect to the head 2, and turns the head 2 in the direction of a B axis (arrow B) with respect to the support member 3.

The numerical control device controls the drive device so as to control drive axes formed with the three directly moved axes (the X axis, the Y axis and the Z axis) and the two rotation axes (the A axis and the B axis), and thereby controls the relative position of the tool T with respect to the work W and the posture thereof. In this way, the machine tool 10 machines the work W while changing the relative position of the tool T with respect to the work W and the posture thereof.

In the machine tool 10 as described above, when the work W is machined, a failure (streaks or stripes) may occur on the machined surface of the work W due to any cause such as vibrations. For example, vibrations are transmitted to the head 2 holding the tool T or the table 6 holding the work W, and thus the tool T or the work W may be vibrated. For example, when the direction of movement of the head 2 or the table 6 is switched at the time of machining, vibrations occur. Vibrations are also transmitted from a fan motor in an inverter or the like within the machine tool 10 or various machines or the like outside the machine tool 10. When the tool T or the work W is vibrated by the vibrations of the machine tool 10 as described above, a failure may occur on the machined surface of the work W.

The failure (streaks or stripes) as described above can be detected by using, after the machining of the work W, a vision sensor or the like to sense an image of the machined surface of the work W, and performing image processing on the data of the sensed image. Furthermore, it is possible to detect the depth of the failure from the image data. Then, machining control data is corrected based on the detected depth of the failure such that the relative positions of the work W and the tool T are adjusted, with the result that it is possible to reduce the occurrence of a failure on the machined surface of the work.

The present invention relates to a numerical control system in a machine tool which reduces, based on failure information detected from spatial machined surface measurement data such as image data after the machining of a work, the occurrence of a failure on the machined surface of the work.

Numerical Control System of Machine Tool According to First Embodiment

Figure 2:
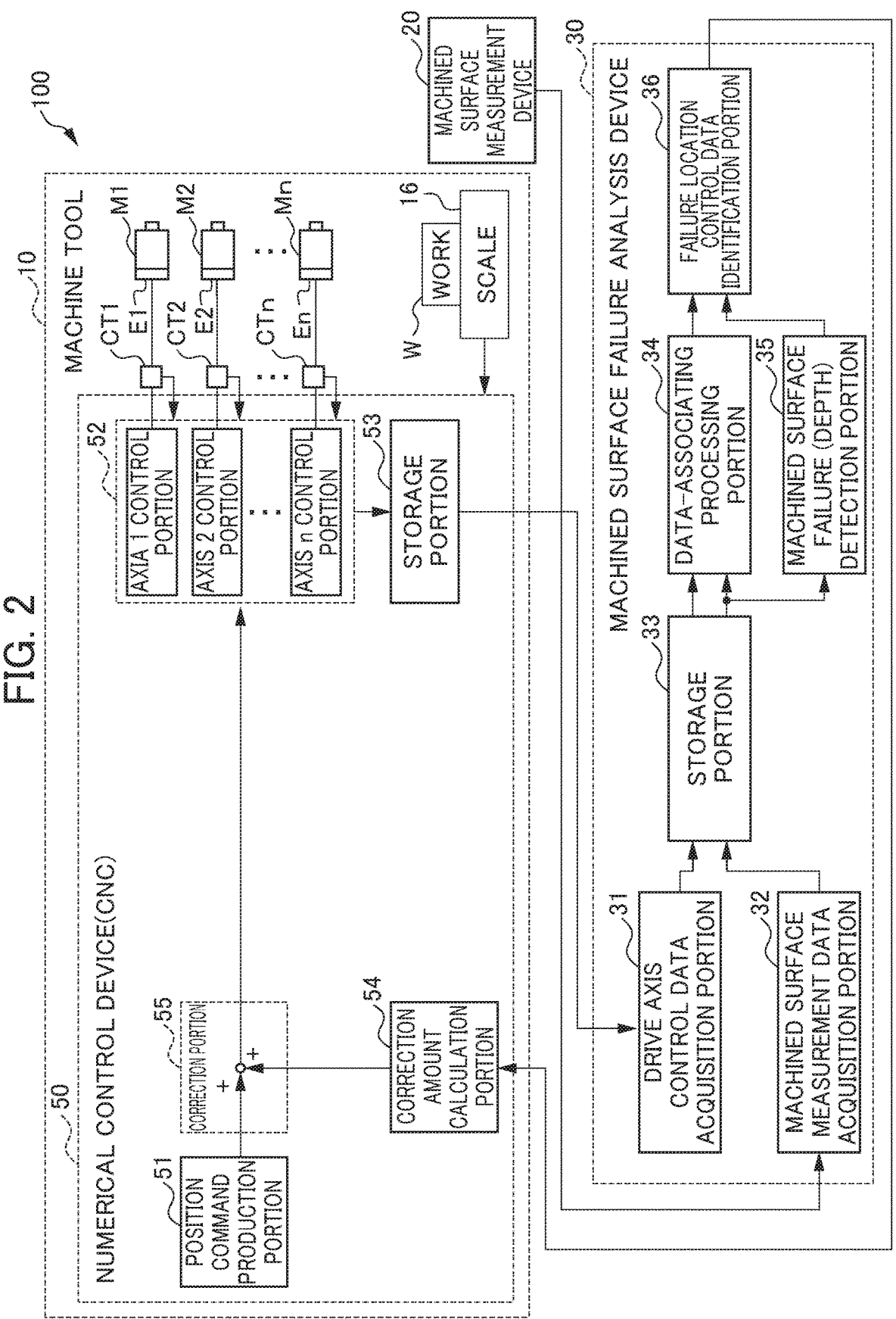
FIG. 2 is a diagram showing the configuration of a numerical control system in the machine tool according to a first embodiment of the present invention.

Net, the numerical control system of a machine tool according to a first embodiment of the present invention will be described. FIG. 2 is a diagram showing the configuration of the numerical control system in the machine tool according to the first embodiment of the present invention. The numerical control system 100 of the machine tool shown in FIG. 2 includes the machine tool 10 described above, a machined surface measurement device 20 and a machined surface failure analysis device 30.

Although in the machine tool 10 described above, the five drive axes (the X axis, the Y axis, the Z axis, the A axis and the B axis) are illustrated, the machine tool 10 of the present embodiment includes n drive axes. The machine tool 10 includes n servomotors M1, M2, . . . and Mn corresponding to the drive device described above, encoders (position/speed detectors) E1, E2, . . . and En which are respectively provided in the servomotors thereof, current detectors CT1, CT2, . . . and CTn, a scale (position detector) 16 and a numerical control device (CNC) 50. In FIG. 2, only the configuration of the machine tool 10 which is related to the characteristics of the present invention is shown, and other configurations are omitted.

The servomotors M1, M2, . . . and Mn respectively drive the n drive axes by the control of the numerical control device 50. The encoders E1, E2, . . . and En respectively detect the rotation positions of the servomotors M1, M2, . . . and Mn, and transmit the detected rotation positions to the numerical control device 50 as position feedback values. The encoders E1, E2, and En respectively detect the rotation speeds of the servomotors M1, M2, . . . and Mn, and transmit the detected rotation speeds to the numerical control device 50 as speed feedback values.

The current detectors CT1, CT2, . . . and CTn respectively detect the drive current values of the servomotors M1, M2, . . . and Mn, and transmit the detected current values to the numerical control device 50 as current feedback values (actual current values, actual torque values).

For example, the scale 16 is provided in the table 6 on which the work W described above is mounted. The scale 16 detects the position of the work W, and transmits the detected position to the numerical control device 50 as a position feedback value.

The numerical control device 50 generates torque command values (current command values) for the drive axes based on position command values (movement command values) for the drive axes based on a machining program related to the machining of the work W, the position feedback value from the scale 16 or the position feedback values from the encoders E1, E2, . . . and En, the speed feedback values from the encoders E1, E2, . . . and En and the current feedback values from the current detectors CT1, CT2, . . . and CTn, and drives the servomotors M1, M2, . . . and Mn with these torque command values.

Specifically, the numerical control device 50 includes a position command production portion 51, an individual axis control portion 52, a storage portion 53, a correction amount calculation portion 54, and a correction portion 55. The position command production portion 51 produces, based on the machining program stored in the storage portion, the position command values (movement command values) for the drive axes. The individual axis control portion 52 generates the speed command values for the drive axes based on differences between the position command values and the position feedback values, and generates the torque command values (current command values) for the drive axes based on differences between the speed command values and the speed feedback values. The individual axis control portion 52 generates the drive currents for the drive axes based on differences between the torque command values (current command values) and the current feedback values.

The storage portion 53 stores control data for the individual axes from the individual axis control portion 52. The control data includes position control data (position command values, position feedback values), speed control data (speed command values, speed feedback values) and torque control data (torque command values, current feedback values). The storage portion 53 is, for example, a rewritable memory such as an EEPROM.

The correction amount calculation portion 54 calculates, based on the position control data of a failure location identified by the machined surface failure analysis device 30 which will be described later and the corresponding failure depth, the correction amount of the position command value produced by the position command production portion 51. Specifically, the correction amount calculation portion 54 calculates, based on information (S, u) generated by the machined surface failure analysis device 30, the correction amount C(S) of the position command value with respect to each position S based on the depth u of the failure corresponding to each position S from a function f(x) in formula (1) below.

$$C(S)=f(u) \quad (1)$$

The correction portion 55 corrects, based on the correction amount C(S) calculated by the correction amount calculation portion 54, the position command value from the position command production portion 51, and transmits it to the individual axis control portion 52. Specifically, the correction portion 55 includes an adder so as to add the correction amount from the correction amount calculation portion 54 to the position command value from the position command production portion 51.

The numerical control device 50 is formed with, for example, a computation processor such as a DSP (Digital Signal Processor) or an FPGA (Field-Programmable Gate Array). The various types of functions of the numerical control device 50 are realized by executing predetermined software (programs, applications) stored in the storage portion. The various types of functions of the numerical control device 50 may be realized by the cooperation of hardware and software or may be realized only by hardware (electronic circuit).

The machined surface measurement device 20 is a device which measures the work W so as to measure the machined surface of the work W. Specific examples of the machined surface measurement device 20 include a vision sensor, an optical microscope, a laser microscope and a three-dimensional coordinate measurement device. The machined surface measurement device 20 transmits the image data or the position data of the work W measured to the machined surface failure analysis device 30. The machined surface measurement device 20 is provided in, for example, a measurement stage, a fixing stage or an end factor of a robot outside the machine tool 10. The machined surface measurement device 20 may also be incorporated in the machine tool 10.

The machined surface failure analysis device 30 is a device which analyzes the failure (streaks or stripes) on the machined surface of the work W. Specifically, the machined surface failure analysis device 30 estimates the depth of the failure (streaks or stripes). The machined surface failure analysis device 30 includes a drive axis control data acquisition portion (first acquisition portion) 31, a machined surface measurement data acquisition portion (second acquisition portion) 32, a storage portion 33, a data-associating processing portion 34, a machined surface failure (depth) detection portion 35 and a failure location control data identification portion 36.

The drive axis control data acquisition portion 31 acquires chronological drive axis control data stored in the storage portion 53 of the numerical control device 50 when the work W is machined. Specifically, the drive axis control data acquisition portion 31 acquires, as the drive axis control data, the position control data (the position command values, the position feedback values of the work W detected by the scale 16 or the position feedback values of the servomotors M1, M2, . . . and Mn detected by the encoders E1, E2, . . . and En), (position information (machine information) of the drive axes).

The machined surface measurement data acquisition portion 32 acquires the spatial machined surface measurement data after the machining of the work W measured by the machined surface measurement device 20. Specifically, the machined surface measurement data acquisition portion 32 acquires, as the machined surface measurement data, three-dimensional image data or position data (coordinate data).

The storage portion 33 stores the chronological position control data acquired by the drive axis control data acquisition portion 31 and the spatial machined surface measurement data measured by the machined surface measurement device 20. The storage portion 33 is, for example, a rewritable memory such as an EEPROM.

The data-associating processing portion 34 associates the chronological position control data and the spatial machined surface measurement data stored in the storage portion 33 with each other. The details of the data-associating processing will be described later.

The machined surface failure (depth) detection portion 35 detects, based on the spatial machined surface measurement data stored in the storage portion 33, the failure (streaks or stripes) on the machined surface of the work W and the location thereof and the failure depth of the failure location.

The failure location control data identification portion 36 identifies, based on the position control data and the machined surface measurement data associated with each other by the data-associating processing portion 34, the position control data of the failure location corresponding to the machined surface measurement data of the failure location detected by the machined surface failure (depth) detection portion 35, and thereby identifies the failure depth corresponding to the control data of the failure location. Specifically, the failure location control data identification portion 36 generates information (S, u) of a group of the position S and the depth u of the failure in the control data of the failure location. The failure location control data identification portion 36 also associates the direction of the machined surface failure (streaks or stripes) and the direction of machining based on the chronological position control data of the failure location with each other.

The machined surface failure analysis device 30 is formed with, for example, a computation processor such as a DSP (Digital Signal Processor) or an FPGA (Field-Programmable Gate Array). The various types of functions of the machined surface failure analysis device 30 are realized by executing predetermined software (programs, applications) stored in the storage portion (unillustrated). The various types of functions of the machined surface failure analysis device 30 may be realized by the cooperation of hardware and software or may be realized only by hardware (electronic circuit).

The various types of functions of the machined surface failure analysis device 30 may be realized in the numerical control device 50 of the machine tool 10.

Figure 3:
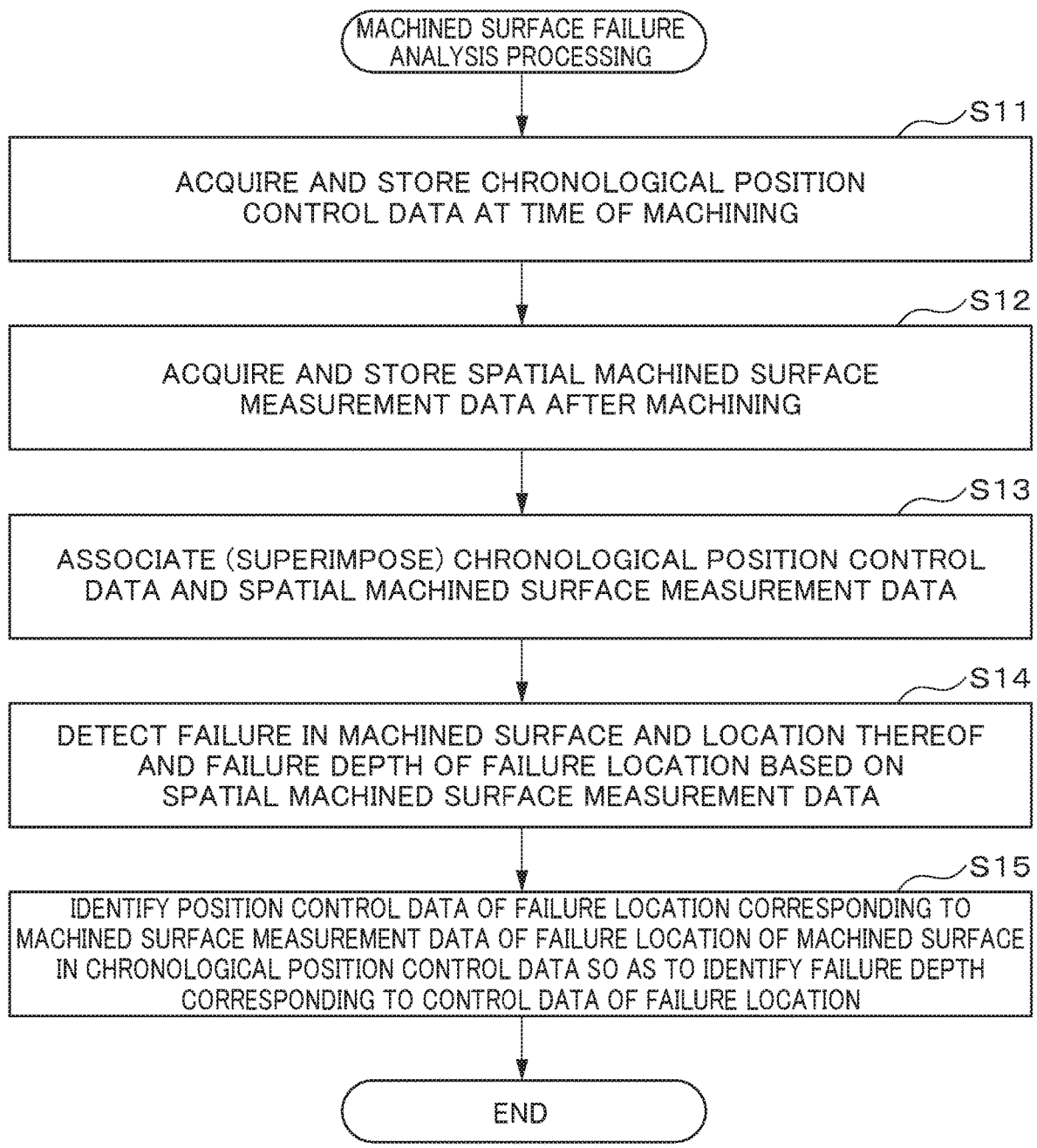
FIG. 3 is a flowchart showing machined surface failure analysis processing performed by a machined surface failure analysis device in the numerical control system in the machine tool according to the first embodiment of the present invention.
Figure 5:
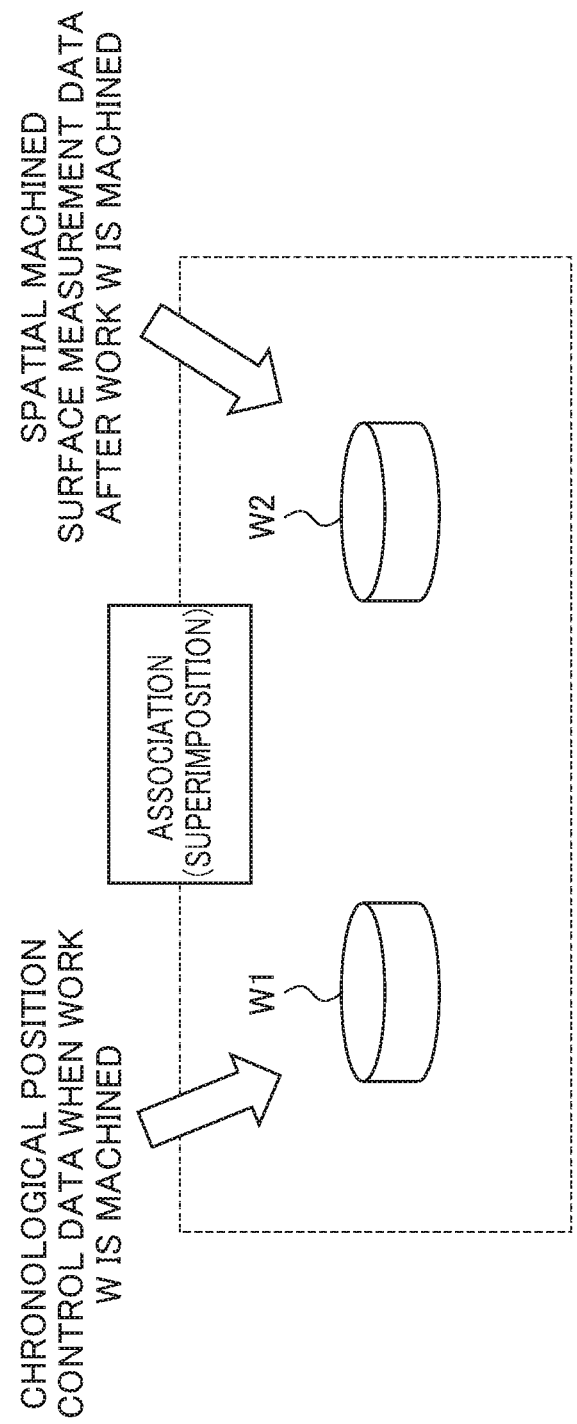
FIG. 5 is a diagram schematically showing data-associating processing.
Figure 6:
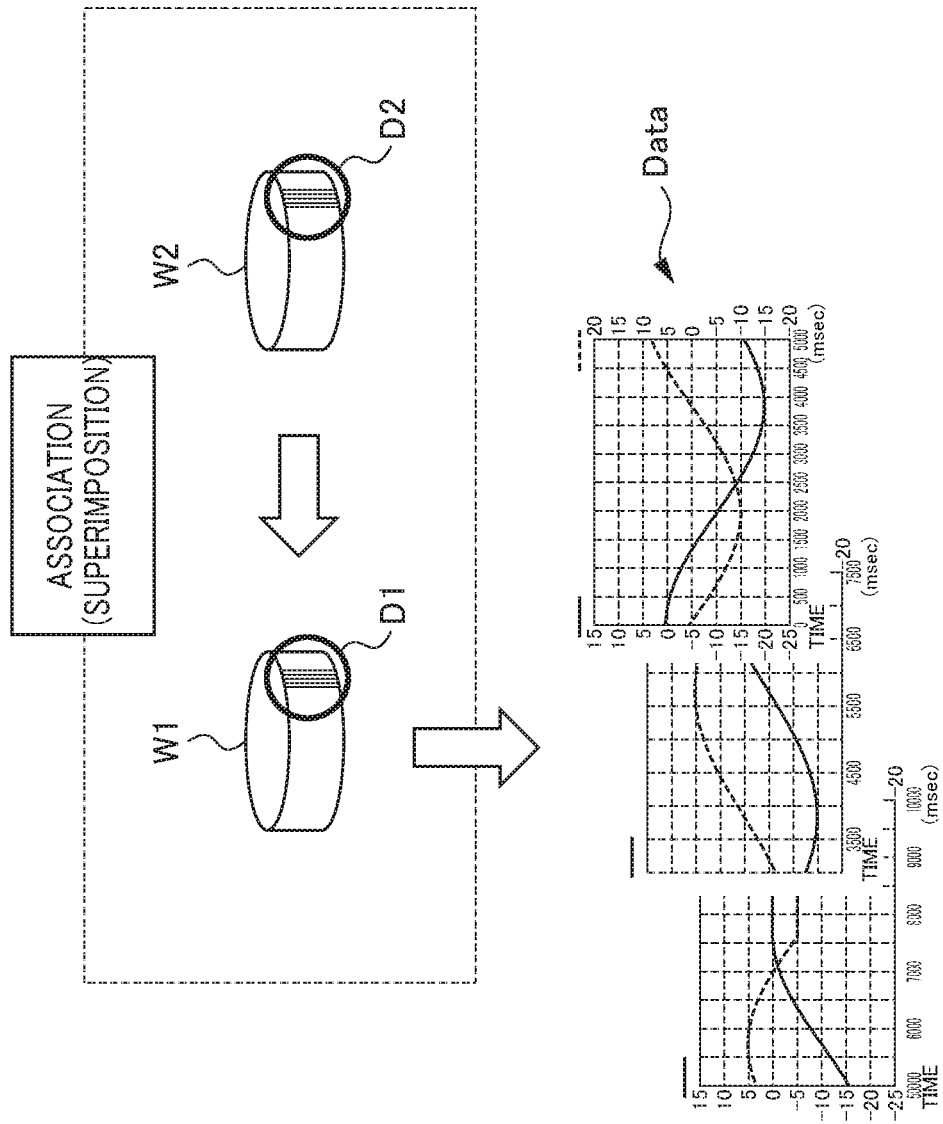
FIG. 6 is a diagram schematically showing identification processing on the control data of the location of a failure.
Figure 7:
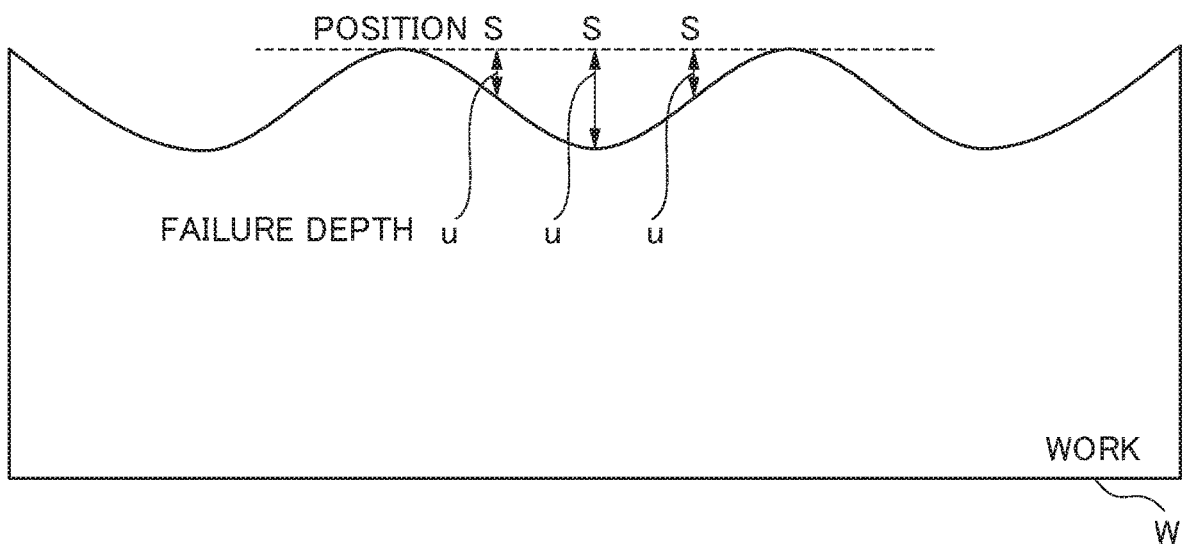
FIG. 7 is a schematic diagram showing a failure (streaks or stripes) when the work is seen in a direction parallel to the machined surface of the work.

Next, the machined surface failure analysis processing performed by the machined surface failure analysis device 30 of the numerical control system 100 in the machine tool according to the first embodiment and a control data correction procedure performed by the numerical control device 50 will be described with reference to FIGS. 3 to 7. FIG. 3 is a flowchart showing the machined surface failure analysis processing performed by the machined surface failure analysis device 30 in the numerical control system 1 in the machine tool according to the first embodiment. FIG. 1 is a flowchart showing a control data correction procedure performed by the numerical control device 50 of the numerical control system 100 in the machine tool according to the first embodiment. FIG. 5 is a diagram schematically showing the data-associating processing. FIG. 6 is a diagram schematically showing identification processing on the control data of the failure location. FIG. 7 is a schematic diagram showing the failure (streaks or stripes) when the work is seen in a direction parallel to the machined surface of the work W.

Machined Surface Failure Analysis Processing

When the work W is machined by the machine tool 10, the numerical control device 50 controls the drive axes based on the position command values, the speed command values and the torque command values (current command values) for the drive axes, the position feedback values from the scale 16 (or the position feedback values from the encoders E1, E2, . . . and En), the speed feedback values from the encoders E1, E2, . . . and En and the current feedback values (actual current values, actual torque values) from the current detectors CT1, CT2, . . . and CTn, and thereby controls the relative position of the tool T with respect to the work W and the posture thereof.

When the work W is machined, in step S11 of FIG. 3, the drive axis control data acquisition portion 31 acquires the chronological position control data (the position command values, the position feedback values of the work W detected by the scale 16 or the position feedback values of the servomotors M1, M2, . . . and Mn detected by the encoders E1, E2, . . . and En), (position information (machine information) of the drive axes).

When the machining of the work W is completed, the machined surface measurement device 20 measures the machined surface of the work W. Here, in step S12, the machined surface measurement data acquisition portion 32 acquires the spatial machined surface measurement data from the machined surface measurement device 20, and stores it in the storage portion 33. Specifically, the machined surface measurement data acquisition portion 32 acquires, as the machined surface measurement data, the three-dimensional image data or the position data (coordinate data).

Then, in step S13, the data-associating processing portion 34 associates the chronological position control data and the spatial machined surface measurement data stored in the storage portion 33 with each other. Here, after the machining of the work, for example, the data of an image sensed by a vision sensor is three-dimensional data whereas the position control data obtained from the numerical control device 50 when the work H is machined is chronological data, with the result that it is not easy to associate these types of data with each other. The inventors et al. of the present application use the following method in order to associate these types of data with each other.

Specifically, the data-associating processing portion 34 first converts the machined surface measurement data into machine coordinate data. For example, when the machined surface measurement device 20 is a vision sensor, the machined surface measurement data is image data. In this case, the data-associating processing portion 34 uses an image processing technology so as to determine the coordinate data of the work W from the image data. Then, the data-associating processing portion 34 converts the coordinate data of the work W into the machine coordinate data based on a distance between the machined surface measurement device 20 and the work W and the position (machine coordinates) and the angle (angle of view) of the machined surface measurement device 20.

On the other hand, when the machined surface measurement device 20 is an optical microscope, a laser microscope, or a three-dimensional coordinate measurement device, the machined surface measurement data is position data (coordinate data). In this case, the data-associating processing portion 34 converts the position data (coordinate data) of the work W into the machine coordinate data based on the distance between the machined surface measurement device 20 and the work W and the position (machine coordinates) and the angle (angle of view) of the machined surface measurement device 20.

Then, the data-associating processing portion 34 associates the chronological position control data (machine coordinates) when the work W is machined and the spatial position data (machine coordinates) of the machined surface after the machining of the work W with each other. For example, as shown in FIG. 5, the data-associating processing portion 34 produces a first work shape image W1 based on the chronological position control data (machine coordinates) when the work W is machined. Likewise, the data-associating processing portion 34 produces a second work shape image W2 based on the spatial position data (machine coordinates) of the machined surface after the machining of the work W. Then, the data-associating processing portion 34 associates the chronological position control data and the spatial position data of the machined surface with each other so as to superimpose the first work shape image W1 and the second work shape image W2 on each other.

Then, in step S14, the machined surface failure (depth) detection portion 35 detects, based on the spatial machined surface measurement data stored in the storage portion 33, the failure (streaks or stripes) on the machined surface of the work W and the location thereof and the failure depth of the failure location. Specifically, when the machined surface measurement device 20 is a vision sensor, the machined surface measurement data is image data. In this case, the machined surface failure (depth) detection portion 35 detects the failure on the machined surface and the location thereof from the characteristic amount of streak and stripe on the machined surface in the image data. As shown in FIG. 7, the machined surface failure (depth) detection portion 35 detects the failure depth u in a plurality of positions (machine coordinates) S in the failure location. In the present embodiment, the failure depth u is a depth with respect to the highest position of the machined surface of the work W, and is a positive value.

On the other hand, when the machined surface measurement device 20 is an optical microscope, a laser microscope or a three-dimensional coordinate measurement device, the machined surface measurement data is position data (coordinate data). In this case, the machined surface failure (depth) detection portion 35 detects the failure on the machined surface and the location thereof from a small variation (such as vibration) in the position of the machined surface in the position data (coordinate data). As shown in FIG. 7, the machined surface failure (depth) detection portion 35 detects the failure depth u in a plurality of positions (machine coordinates) S in the failure location.

Then, in step S15, as shown in FIG. 6, the failure location control data identification portion 36 identifies, based on the position control data (the first work shape image W1) and the machined surface measurement data (the second work shape image W2) associated with each other by the data-associating processing portion 34, the position control data of a failure location D1 corresponding to the machined surface measurement data of a failure location D2 detected by the machined surface failure (depth) detection portion 35. In this way, the failure location control data identification portion 36 identifies the failure depth corresponding to the position control data of the failure location D1. Specifically, the failure location control data identification portion 36 generates the information (S, u) of the group of the position (machine coordinates) S and the depth (vector) u of the failure in the control data of the failure location D1.

The failure location control data identification portion 36 also associates the direction of the machined surface failure (streaks or stripes) and the direction of machining based on the chronological control data of the failure location with each other.

Control Data Correction Procedure

Figure 4:
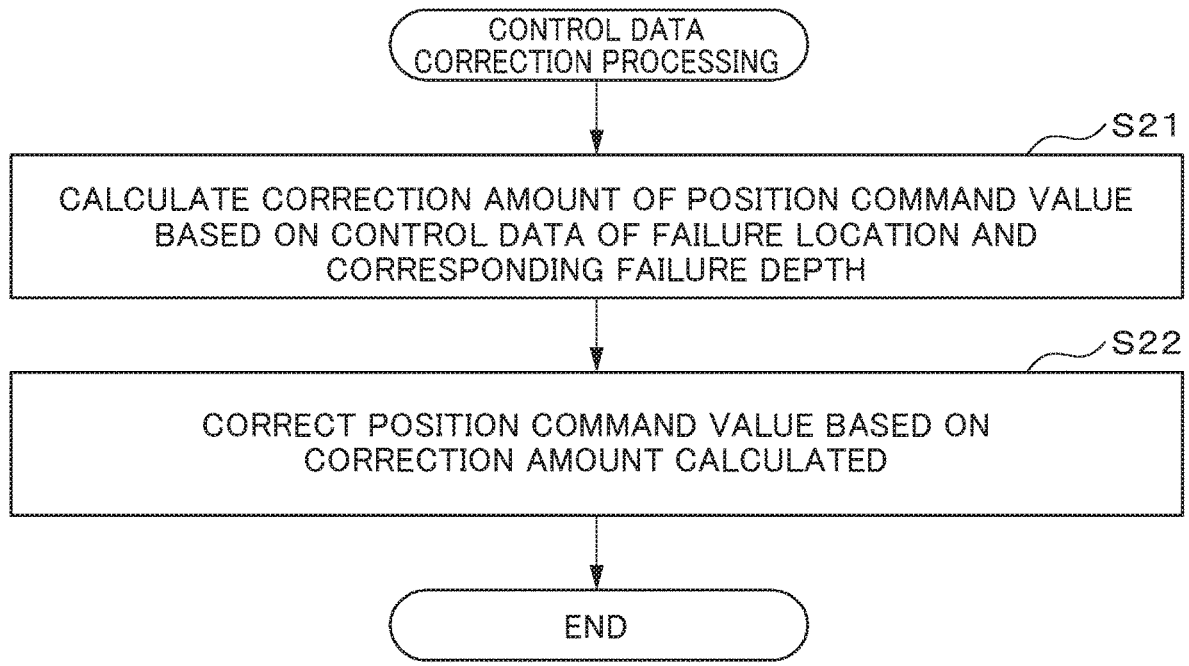
FIG. 4 is a flowchart showing control data correction processing performed by the numerical control device of the numerical control system in the machine tool according to the first embodiment of the present invention.

When the subsequent work is machined, in step S21 of FIG. 4, the correction amount calculation portion 54 in the numerical control device 50 calculates, based on the control data of the failure location identified by the machined surface failure analysis device 30 and the corresponding failure depth, the correction amount of the position command value produced by the position command production portion 51. Specifically, the correction amount calculation portion 54 calculates, based on the information (S, u) generated by the machined surface failure analysis device 50, the correction amount C(S) of the position command value with respect to each position S based on the depth u of the failure corresponding to each position S from the function f(x) in formula (1) below.

$$C(S)=f(u) \qquad (1)$$

The position command value may be absolute (S) (absolute position) or may be incremental (ΔS) (relative position).

Then, in step S22, the correction portion 55 corrects, based on the correction amount C(S) calculated by the correction amount calculation portion 54, the position command value from the position command production portion 51, and transmits it to the individual axis control portion 52. Specifically, the correction portion 55 includes an adder so as to add the correction amount from the correction amount calculation portion 54 to the position command value from the position command production portion 51. In this way, for example, when the tip of the tool is lowered due to the vibration of the machine tool, a correction can be made such that the position of the tip of the tool is raised according to the lowering thereof (according to the depth of the failure).

In the present embodiment, the correction amount C(S) and the position command value are added together. However, the sign of the correction amount C(S) may be reversed, and a subtractor for subtracting the correction amount C(S) from the position command value may be used.

As described above, in the numerical control system 100 of the machine tool of the present embodiment, the machined surface failure analysis device 30 detects the failure (streaks or stripes) on the machined surface of the work H and the location thereof and the failure depth of the failure location. The machined surface failure analysis device 30 also associates the chronological position control data when the work is machined and the spatial work machined surface measurement data after the machining of the work with each other, identifies the position control data of the failure location corresponding to the work machined surface measurement data of the machined surface failure location of the work H, and thereby identifies the failure depth corresponding to the control data of the failure location. Then, the numerical control device 50 corrects, based on the position control data of the failure location identified by the machined surface failure analysis device 30 and the corresponding failure depth, the position control data so as to reduce the occurrence of a failure, and thereby corrects the position of the drive axes in the machine tool. In this way, in the subsequent rounds of machining, it is possible to reduce the occurrence of a failure (streaks or stripes) on the machined surface of the work, and thus it is possible to enhance the quality of the machined surface.

Numerical Control System of Machine Tool According to Second Embodiment

In the first embodiment, the position command value is corrected according to the failure depth of the machined surface of the work W. In a second embodiment, at least any one of the speed, the acceleration and the jerk in movement command data generated by acceleration/deceleration processing is changed according to the failure depth of the machined surface of the work W.

Figure 8:
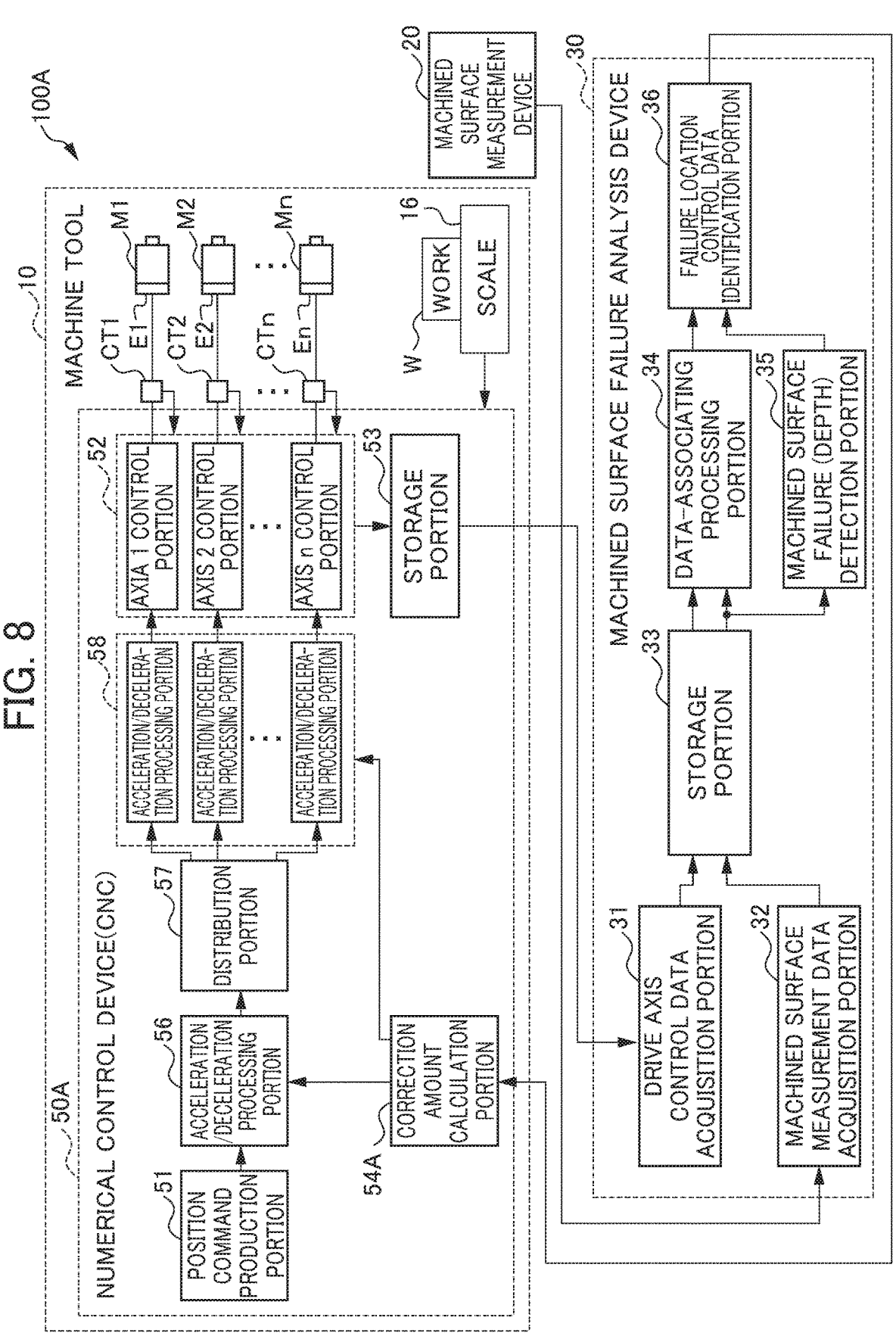
FIG. 8 is a diagram showing the configuration of the numerical control device of a numerical control system in a machine tool according to a second embodiment of the present invention.

FIG. 8 is a diagram showing the configuration of a numerical control system in a machine tool according to the second embodiment of the present invention. A numerical control system 100A of the second embodiment shown in FIG. 8 differs from the numerical control system 100 of the first embodiment shown in FIG. 2 described above in that instead of the numerical control device 50, a numerical control device 50A is included.

The numerical control device 50A includes, instead of the correction amount calculation portion 54 and the correction portion 55 in the numerical control device 50 of FIG. 2 described above, a correction amount calculation portion 54A, an acceleration/deceleration processing portion 56, a distribution portion 57, and an individual axis acceleration/deceleration processing portion 58.

The correction amount calculation portion 54A calculates, based on the position control data of the failure location identified by the machined surface failure analysis device 30 and the corresponding failure depth, at least any one of a speed correction amount, an acceleration correction amount and a jerk correction amount. Specifically, the correction amount calculation portion 54A individually calculates, based on the information (S, u) generated by the machined surface failure analysis device 30, at least any one of a speed correction amount v(S), an acceleration correction amount v'(S) and a jerk correction amount v''(S) based on the depth u of the failure corresponding to each position S from functions g1(x) to g3(x) in formulas (2) to (4) below.

$$v(S)=g1(u) \qquad (2)$$

$$v'(S)=g2(u) \qquad (3)$$

$$v''(S)=g3(u) \qquad (4)$$

Figure 10:
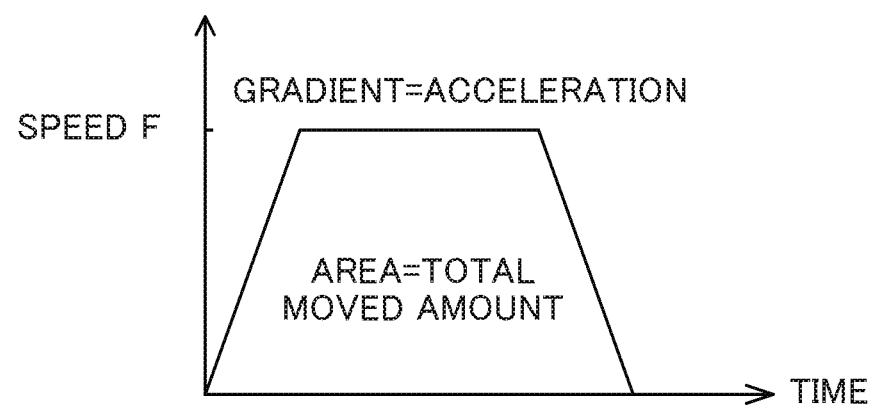
FIG. 10 is a schematic diagram showing movement command data generated by acceleration/deceleration processing.

The acceleration/deceleration processing portion 56 performs the acceleration/deceleration processing based on the position command value from the position command production portion 51 so as to generate the movement command data. FIG. 10 is a schematic diagram showing an example or the movement command data generated by the acceleration/deceleration processing. The acceleration/deceleration processing portion 56 generates, for example, as shown in FIG. 10, the movement command data in which an acceleration operation is performed at a predetermined acceleration rate at the time of start of the movement, in which a constant speed operation is thereafter performed and in which a deceleration operation is performed at a predetermined acceleration rate at the time of completion of the movement. Here, the acceleration/deceleration processing portion 56 changes, based on at least any one of the speed correction amount v(S), the acceleration correction amount v'(S) and the jerk correction amount v"(S) calculated by the correction amount calculation portion 54A, at least any one of the speed, the acceleration and the jerk in the movement command data.

The distribution portion 57 distributes the movement command data changed by the acceleration/deceleration processing portion 56 to the acceleration/deceleration processing portions of the individual axes in the individual axis acceleration/deceleration processing portion 58.

The acceleration/deceleration processing portions of the individual axes in the individual axis acceleration/deceleration processing portion 58 further change, based on at least any one of the speed correction amount v(S), the acceleration correction amount v'(S) and the jerk correction amount v"(S) calculated by the correction amount calculation portion 54A, at least any one of the speed, the acceleration and the jerk in the movement command data that were changed and distributed, and transmit them to the individual axis control portion 52.

Figure 9:
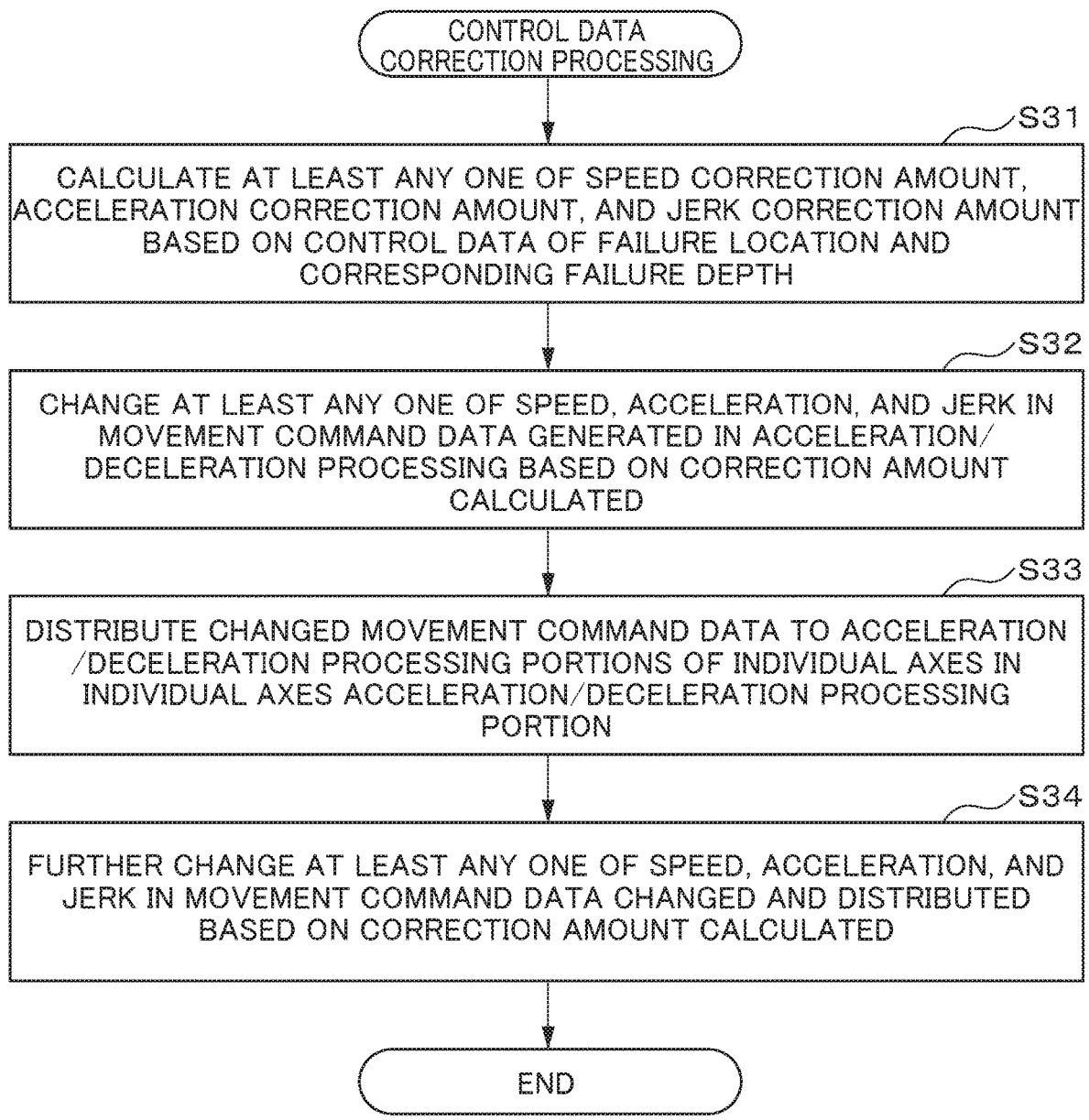
FIG. 9 is a flowchart showing control data correction processing performed by the numerical control device of the numerical control system in the machine tool according to the second embodiment of the present invention.

Next, the control data correction procedure performed by the numerical control device 50A of the numerical control system 100A in the machine tool of the second embodiment will be described with reference to FIG. 9. FIG. 9 is a flowchart showing the control data correction procedure performed by the numerical control device 50A of the numerical control system 100A in the machine tool of the second embodiment.

Control Data Correction Procedure

When the subsequent work is machined, in step S31 of FIG. 9, the correction amount calculation portion 54A in the numerical control device 50A calculates, based on the control data of the failure location identified by the machined surface failure analysis device 30 and the corresponding failure depth, at least any one of the speed correction amount, the acceleration correction amount and the jerk correction amount. Specifically, the correction amount calculation portion 54A individually calculates, based on the information (S, u) generated by the machined surface failure analysis device 30, at least any one of the speed correction amount v(S), the acceleration correction amount v'(S) and the jerk correction amount v"(S) based on the depth u of the failure corresponding to each position S from functions g1(x) to g3(x) in formulas (2) to (4) below.

$$v(S)=g1(u) \quad (2)$$

$$v'(S)=g2(u) \quad (3)$$

$$v''(S)=g3(u) \quad (4)$$

Then, in step S32, the acceleration/deceleration processing portion 56 changes, based on at least any one of the speed correction amount v(S), the acceleration correction amount v'(S) and the jerk correction amount v"(S) calculated by the correction amount calculation portion 54A, at least any one of the speed, the acceleration and the jerk in the movement command data generated by the acceleration/deceleration processing.

Then, in step S33, the distribution portion 57 distributes the movement command data changed by the acceleration/deceleration processing portion 56 to the acceleration/deceleration processing portions of the individual axes in the individual axis acceleration/deceleration processing portion 58.

Then, in step S34, the acceleration/deceleration processing portions of the individual axes in the individual axis acceleration/deceleration processing portion 58 further change, based on at least any one of the speed correction amount v(S), the acceleration correction amount v'(S) and the jerk correction amount v"(S) calculated by the correction amount calculation portion 54A, at least any one of the speed, the acceleration and the jerk in the movement command data that were changed and distributed, and transmit them to the individual axis control portion 52.

In this way, for example, as the failure depth of the machined surface of the work W is increased due to the vibration of the machine tool, the values of the speed, the acceleration and the jerk in the movement command data are decreased (in other words, an acceleration/deceleration time constant is decreased). In this way, even in the present embodiment, in the subsequent rounds of machining, it is possible to reduce the occurrence of a failure (streaks or stripes) on the machined surface of the work, and thus it is possible to enhance the quality of the machined surface.

Although the embodiments of the present invention are described above, the present invention is not limited to the embodiments described above. The effects described in the present embodiments are simply those which are obtained by listing the most preferred effects produced from the present invention, and thus the effects of the present invention are not limited to those described in the present embodiments.

For example, in the embodiments described above, the data-associating processing portion 34 of the machined surface failure analysis device 30 directly associates the position control data itself from the numerical control device 50 and the machined surface measurement data from the machined surface measurement device 20 with each other in order to identify the position control data corresponding to the machined surface measurement data of the failure location. However, the data-associating processing portion 34 may indirectly associate the speed control data from the numerical control device 50 and the machined surface measurement data with each other, identify the speed control data corresponding to the machined surface measurement data of the failure location, and identify the position control data corresponding to the speed control data. In this case, the drive axis control data acquisition portion 31 and the data-associating processing portion 34 in the machined surface failure analysis device 30 are preferably functioned and operated as follows.

The drive axis control data acquisition portion 31 acquires, from the numerical control device 50, as the chronological drive axis control data when the work W is machined, the speed control data (speed command values, speed feedback values) and the position control data (position command values, position feedback values), and stores them in the storage portion 33 (step S11 of FIG. 3).

The data-associating processing portion 34 associates the chronological speed control data and the spatial machined surface measurement data stored in the storage portion 33 with each other (step 313 of FIG. 3). Here, for example, the machine tool machines the entire work W while reciprocating the tool T with respect to the work W. Here, when the tool T makes contact with the work W and when the tool T is separated from the work W, the speed command values and the speed feedback values are varied. In this way, the point of a variation in the speed command values or the point of a variation in the speed feedback values is detected, and thus it is possible to detect the edge position of the work W, that is, the outline of the work W.

Since the speed command values and the speed feedback values are also varied according to acceleration/deceleration, in the present embodiment, a value obtained by subtracting a value corresponding to a variation in acceleration/deceleration from the speed command values and the current feedback values is used. In this way, a return point when the tool T is reciprocated with respect to the work W is prevented from being erroneously detected as the edge position of the work W. When the tool T is not reciprocated with respect to the work W, the speed command values and the speed feedback values may be used without being processed.

Specifically, the data-associating processing portion 34 detects, based on the point of a variation in the value obtained by subtracting the value corresponding to a variation in acceleration/deceleration from the chronological speed control data, as the edge position of the work W, a machining start position and a machining completion position, and thereby produces the first work shape (outline) image W1 as shown in FIG. 5.

The data-associating processing portion 34 also detects, based on the spatial machined surface measurement data after the machining of the work W, the edge position of the work, and thereby produces the second work shape (outline) image W2 as shown in FIG. 5. For example, when the machined surface measurement device 20 is a vision sensor, the machined surface measurement data is image data. In this case, the data-associating processing portion 34 uses an image processing technology so as to detect the edge position of the work W from the image data and thereby produce the second work shape (outline) image W2.

On the other hand, when the machined surface measurement device 20 is an optical microscope, a laser microscope or a three-dimensional coordinate measurement device, the machined surface measurement data is position data (coordinate data). In this case, the data processing portion 34 detects the edge position of the work W from the position data (coordinate data) and thereby produce the second work shape (outline) image W2.

Then, the data-associating processing portion 34 associates the chronological speed control data and the spatial machined surface measurement data of the machined surface with each other so as to superimpose the first work shape image W1 and the second work shape image W2 on each other.

Here, in the numerical control device 50, the speed control data and the position control data are associated with each other. In this way, the data-associating processing portion 34 associates the chronological speed control data and the position control data stored in the storage portion 33 with each other so as to associate the chronological position control data and the spatial machined surface measurement data of the machined surface with each other.

In the embodiments described above, the data-associating processing portion 34 may indirectly associate the torque control data from the numerical control device 50 and the machined surface measurement data with each other, identify the torque control data corresponding to the machined surface measurement data of the failure location, and identify the position control data corresponding to the torque control data. In this case, as in the case of the speed control data described above, based on the point of a variation in the torque control data, the torque control data corresponding to the machined surface measurement data of the failure location may be indented.

Although in the embodiments described above, the machined surface failure (depth) detection portion 35 of the machined surface failure analysis device 30 automatically detects the failure on the machined surface and the location thereof from the image data or the position data (coordinate data) of the work W (machined surface) from the machined surface measurement device 20, they may be detected manually. Although in the embodiments described above, the machined surface failure (depth) detection portion 35 automatically detects the depth of the failure (streaks or stripes) on the machined surface of the work W, it may be detected manually. For example, the measurement result (three-dimensional image data or position data) of the machined surface measurement device 20 may be displayed on a monitor or the like, the failure and the location thereof and the failure depth of the failure location may be visually detected by the user and thus the failure location and the depth of the failure detected may be manually input to the data processing device 30.

EXPLANATION OF REFERENCE NUMERALS 2 head
3 support member
4 support column
5 base
6 table
10 machine tool
16 scale
20 machined surface measurement device
30 machined surface failure analysis device (analysis device)
31 drive axis control data acquisition portion (first acquisition portion)
32 machined surface measurement data acquisition portion (second acquisition portion)
33, 53 storage portion
34 data-associating processing portion
35 machined surface failure (depth) detection portion
36 failure location control data identification portion (identification portion)
50, 50A numerical control device (control device)
51 position command production portion
52 individual axis control portion
54, 54A correction amount calculation portion
55 correction portion
56 acceleration/deceleration processing portion
57 distribution portion
58 individual axis acceleration/deceleration processing portion
100, 100 numerical control system (control system)
CT1, CT2, . . . and CTn current detector
E1, E2, . . . and En encoder
M1, M2, . . . and Mn servomotor
T tool
W work

What is claimed is:
1. A control system of a machine tool which machines a work, the control system comprising:
a control device which controls a drive axis of the machine tool based on control data that comprise movement command data for commanding the control device;

a machined surface measurement device which measures a machined surface of the work; and an analysis device which analyzes the machined surface of the work, wherein the analysis device includes:

a first acquisition portion which acquires, from the control device, chronological control data when the work is machined;

a second acquisition portion which acquires spatial machined surface measurement data after the machining of the work measured by the machined surface measurement device;

a data-associating processing portion which associates the chronological control data acquired by the first acquisition portion and the spatial machined surface measurement data acquired by the second acquisition portion with each other;

a machined surface failure detection portion which detects a feature on the machined surface of the work as a failure in machining, a location of the feature as a failure location, and a depth of the feature as a failure depth of the failure location based on the spatial machined surface measurement data acquired by the second acquisition portion; and an identification portion which identifies, based on the control data and the machined surface measurement data associated with each other by the data-associating processing portion, control data of the failure location corresponding to the machined surface measurement data of the failure location detected by the machined surface failure detection portion so as to identify the failure depth corresponding to the control data of the failure location, and wherein the control device corrects the control data of the drive axis of the machine tool based on the control data of the failure location identified by the analysis device and the corresponding failure depth.

2. The control system of the machine tool according to claim 1, wherein the identification portion of the analysis device generates information (S, u) of a group of the position S and the depth u of the failure in the control data of the failure location.

3. The control system of the machine tool according to claim 2, wherein the control data includes position command information, and the control device corrects, based on the information (S, u) generated by the analysis device, the position command information corresponding to each of the positions S only by the depth u of the failure corresponding to each of the positions S.

4. The control system of the machine tool according to claim 2, wherein the control data is movement command data including information of a speed, an acceleration, and a jerk, and the control device changes, based on the information (S, u) generated by the analysis device, at least any one of the information of the speed, the acceleration, and the jerk corresponding to each of the positions S based on the depth u of the failure corresponding to each of the positions S.

5. The control system of the machine tool according to claim 1, wherein the control data acquired by the first acquisition portion is position control data of the drive axis of the machine tool, and the data-associating processing portion:

produces a first work shape image based on the chronological position control data;

produces a second work shape image based on the spatial machined surface measurement data; and associates the chronological position control data and the spatial machined surface measurement data with each other so as to superimpose the first work shape image and the second work shape image on each other.

6. The control system of the machine tool according to claim 5, wherein the chronological position control data is machine coordinate information, and the spatial machined surface measurement data is machine coordinate information that is calculated based on machine coordinates of the machined surface measurement device.

7. The control system of the machine tool according to claim 1, wherein the first acquisition portion acquires, from the control device, chronological position control data and chronological speed control data when the work is machined, which are the position control data and the speed control data of the drive axis of the machine tool and which are associated with each other, and the data-associating processing portion:

detects, based on a variation in the chronological speed control data, as an edge position of the work, a machining start position and a machining completion position so as to produce a first work shape image;

detects, based on the spatial machined surface measurement data, an edge position of the work so as to produce a second work shape image;

associates the chronological speed control data and the spatial machined surface measurement data with each other so as to superimpose the edge position of the first work shape image and the edge position of the second work shape image on each other; and associates the chronological speed control data and the chronological position control data with each other so as to associate the chronological position control data and the spatial machined surface measurement data with each other.

8. The control system of the machine tool according to claim 1, wherein the first acquisition portion acquires, from the control device, chronological position control data and chronological speed control data when the work is machined, which are the position control data and the speed control data of the drive axis of the machine tool and which are associated with each other, and the data-associating processing portion:

detects, based on a variation in a value obtained by subtracting a value corresponding to a variation in acceleration/deceleration from the chronological speed control data, as an edge position of the work, a machining start position and a machining completion position so as to produce a first work shape image;

detects, based on the spatial machined surface measurement data, an edge position of the work so as to produce a second work shape image;

associates the chronological speed control data and the spatial machined surface measurement data with each other so as to superimpose the edge position of the first work shape image and the edge position of the second work shape image on each other; and associates the chronological speed control data and the chronological position control data with each other so as to associate the chronological position control data and the spatial machined surface measurement data with each other.

9. The control system of the machine tool according to claim 1, wherein the control data is a command value, and the command value is a position command value, a speed command value or a torque command value.

\* \* \* \* \*